United States Patent
Tamura et al.

(10) Patent No.: US 7,577,098 B2
(45) Date of Patent: Aug. 18, 2009

(54) DEVICE AND METHOD FOR NETWORK MONITORING

(75) Inventors: Nobuyuki Tamura, Yokohama (JP); Tomonori Gotoh, Kawasaki (JP); Kazunari Shiota, Yokohama (JP); Kiichi Sugitani, Yokohama (JP); Ryota Komatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 11/189,400

(22) Filed: Jul. 26, 2005

(65) Prior Publication Data

US 2006/0209699 A1  Sep. 21, 2006

(30) Foreign Application Priority Data

Mar. 15, 2005  (JP)  ............................. 2005-073475

(51) Int. Cl.
*H04J 3/14* (2006.01)

(52) U.S. Cl. ........................................ 370/242; 709/224

(58) Field of Classification Search ................ 370/242, 370/227, 228, 247, 252, 230, 235, 253, 248, 370/249, 254, 216–224, 241.1, 241; 709/223, 709/224; 714/47, 48, 704
See application file for complete search history.

(56) References Cited

U.S. PATENT DOCUMENTS

| | | | | |
|---|---|---|---|---|
| 5,315,622 | A * | 5/1994 | Abbiate et al. | ............... 375/354 |
| 5,341,363 | A | 8/1994 | Hirasawa | |
| 5,453,982 | A * | 9/1995 | Pennington et al. | ......... 370/235 |
| 5,870,540 | A | 2/1999 | Wang et al. | |
| 6,269,330 | B1 | 7/2001 | Cidon et al. | |
| 6,279,037 | B1 | 8/2001 | Tams et al. | |
| 6,282,173 | B1 * | 8/2001 | Isonuma et al. | ............. 370/242 |
| 6,574,197 | B1 * | 6/2003 | Kanamaru et al. | .......... 370/252 |
| 6,587,432 | B1 | 7/2003 | Putzolu et al. | |
| 6,831,893 | B1 | 12/2004 | Ben Nun et al. | |
| 6,868,062 | B1 * | 3/2005 | Yadav et al. | ................. 370/234 |
| 2002/0114272 | A1 | 8/2002 | Stewart | |
| 2003/0012209 | A1 | 1/2003 | Abdelilah et al. | |
| 2003/0031462 | A1 | 2/2003 | Katsuno et al. | |
| 2003/0074436 | A1 | 4/2003 | Gieseke | |
| 2003/0112749 | A1 | 6/2003 | Hassink et al. | |
| 2004/0052260 | A1 | 3/2004 | Tabu | |
| 2005/0021715 | A1 | 1/2005 | Dugatkin et al. | |

(Continued)

FOREIGN PATENT DOCUMENTS

JP  2000-151606  5/2000

(Continued)

OTHER PUBLICATIONS

European Search Report dated Oct. 18, 2005.

(Continued)

*Primary Examiner*—Chi H Pham
*Assistant Examiner*—Alexander Boakye
(74) *Attorney, Agent, or Firm*—Fujitsu Patent Center (57) ABSTRACT

A network monitoring device that monitors a network state, includes a receiving unit that receives a packet passing through the network; a processing unit that performs analysis of the network state with respect to the packet received; and a determining unit that determines whether a failure has occurred in the network, based on the result obtained by the processing unit.

8 Claims, 8 Drawing Sheets

U.S. PATENT DOCUMENTS

2006/0259620 A1  11/2006  Tamai

FOREIGN PATENT DOCUMENTS

| JP | 2001-036563 A | 2/2001 |
|---|---|---|
| JP | 2001-069173 A | 3/2001 |
| JP | 2001-519619 | 10/2001 |
| JP | 2001-337873 | 12/2001 |
| JP | 2002-354012 | 12/2002 |
| JP | 2003-023464 A | 1/2003 |
| JP | 2003-060678 | 2/2003 |
| JP | 2003-069567 | 3/2003 |
| JP | 2004-112159 A | 4/2004 |
| JP | 2005-033289 A | 2/2005 |
| WO | 2004/045143 | 5/2004 |
| WO | WO-2005/036864 A1 | 4/2005 |

OTHER PUBLICATIONS

"Japanese Office Action", Partial English Translation, mailed Oct. 14, 2008, in corresponding JP App. No. 2005-073475.

Hidenari, Ohwada et al., "High Speed Network Monitoring", *Technical Report of IEICE*, CS2000-43, vol. 100, No. 301 Sep. 14, 2000, 61-66 Partial English Translation.

Kenichi, Nagami et al., "Management System for Internet Routing Using the OPSF LSA", *the IEICE Transactions*, vol. J87-D-1, No. 5 May 1, 2004, 572-579 Partial English.

* cited by examiner

| TYPE | OFFSET | SIZE | TABLE NO. | NOTE |
|---|---|---|---|---|
| IP | 96 | 64 | TABLE 1 | Source/Destination Address |
| IP | 72 | 8 | TABLE 2 | Protocol Number |
| UDP | 16 | 16 | TABLE 3 | Destination Port Number |
| TCP | 16 | 16 | TABLE 4 | Destination Port Number |
| ... | ... | ... | ... | ... |

FIG.4

| 0 1 2 3 4 5 6 7 8 9 | 0 1 2 3 4 5 6 7 8 9 | 0 1 2 3 4 5 6 7 8 9 | 0 1 |
|---|---|---|---|
| Version | IHL | Type of Service | Total Length |
| Identification | | Flags | Fragment Offset |
| Time to Live | Protocol | Header Checksum | |
| Source Address | | | |
| Destination Address | | | |
| Options | | | Padding |

FIG.5

| 0 1 2 3 4 5 6 7 8 9 | 0 1 2 3 4 5 6 7 8 9 | 0 1 2 3 4 5 6 7 8 9 | 0 1 |
|---|---|---|---|
| Source Port | | Destination Port | |
| Length | | Checksum | |

FIG.6

| 0 1 2 3 4 5 6 7 8 9 | 0 1 2 3 4 5 6 7 8 9 | 0 1 2 3 4 5 6 7 8 9 | 0 1 |
|---|---|---|---|
| Source Port | | Destination Port | |
| Sequence Number | | | |
| Data Offset | Reserved | Flags | Window |
| Checksum | | Urgent Pointer | |
| Options | | | Padding |

FIG.7

(TABLE 1)

| MASK | COMPARISON CONDITION | EVENT | LAST DETECTION TIME |
|---|---|---|---|
| 0xFFFFFF00FFFFFF00 | 192.168.1.0/192.168.2.0 | TRAFFIC COUNT | 2004/12/24 10:03:42 |
| 0xFFFFFF00FFFFFF00 | 192.168.3.0/192.168.2.0 | TRAFFIC COUNT | 2004/12/24 08:36:06 |
| ... | ... | ... | ... |
| - | all | WARNING | - |

FIG.8

(TABLE 2)

| MASK | COMPARISON CONDITION | EVENT | LAST DETECTION TIME |
|---|---|---|---|
| - | 89(OSPF) | PATH CHANGE MONITORING | 2004/12/24 08:35:45 |
| ... | ... | ... | ... |
| - | all | WARNING | - |

FIG.9

(TABLE 3)

| MASK | COMPARISON CONDITION | EVENT NAME | LAST DETECTION TIME |
|---|---|---|---|
| - | 520(RIP) | PATH CHANGE MONITORING | 2004/12/24 09:57:37 |
| - | 80(HTTP) | TRAFFIC COUNT | 2004/12/24 09:43:21 |
| ... | ... | ... | ... |
| - | all | WARNING | - |

FIG.10

(TABLE 4)

| MASK | COMPARISON CONDITION | EVENT NAME | LAST DETECTION TIME |
|---|---|---|---|
| - | 23(TELNET) | CAPTURE | 2004/12/23 18:09:03 |
| - | 25(SMTP) | DETECT FLUCTUATION | 2004/12/24 09:41:46 |
| ... | ... | ... | ... |
| - | all | WARNING | - |

FIG.11

FIG.12

DEVICE AND METHOD FOR NETWORK MONITORING

BACKGROUND OF THE INVENTION

1. Field of the Invention

The present invention relates to a device and a method for monitoring a state of a network of communication devices, and finds a failure in the network at an early stage, even if specifications of the communication devices are different.

2. Description of the Related Art

Recently, due to the development in networking, various kinds of businesses are carried out via a network. Under such circumstances, a network halt for a long time causes a significant damage to the network-dependent businesses. Therefore, a network monitoring system that finds a failure in the network at an early stage, thereby enabling quick response thereto, is of great importance.

Generally, the network monitoring system includes a communication device having a simple network management protocol (SNMP) agent built therein, and a network manager (integrated management device) that integrally manages the whole network monitoring system. The SNMP agent stores the state of the owner device and other communication devices in a database referred to as a management information base (MIB), and exchanges the information stored therein with the network manager.

Japanese Patent Application Laid-Open No. 2000-151606 and Japanese Patent Application Laid-Open No. 2001-337873 disclose techniques related to a network monitoring system including a communication device having an SNMP agent built therein and a network manager.

However, the SNMP agent has a problem of a difference in specifications of vendors. Basic information in the MIB stored in the SNMP agent follows the Request For Comment (RFC) 1213 standard, but equipment-specific information is originally defined by each vendor.

Therefore, when the network is formed of communication devices of a plurality of vendors, unless a network administrator is versed in the specifications of the communication devices of the respective vendors, the network can not be monitored appropriately. This increases the burden on the network administrator, and causes a delay in finding a failure in the network.

SUMMARY OF THE INVENTION

It is an object of the present invention to at least solve the problems in the conventional technology.

According to an aspect of the present invention, a network monitoring device that monitors a network state, includes a receiving unit that receives a packet passing through the network; a processing unit that performs analysis of the network state with respect to the packet received; and a determining unit that determines whether a failure has occurred in the network, based on a result obtained by the processing unit.

According to another aspect of the present invention, a network monitoring method that monitors a network state, includes receiving a packet passing through the network; analyzing the network state with respect to the packet received; and determining whether a failure has occurred in the network, based on a result obtained at the analyzing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below, with reference to the accompanying drawings.

Figure 12:
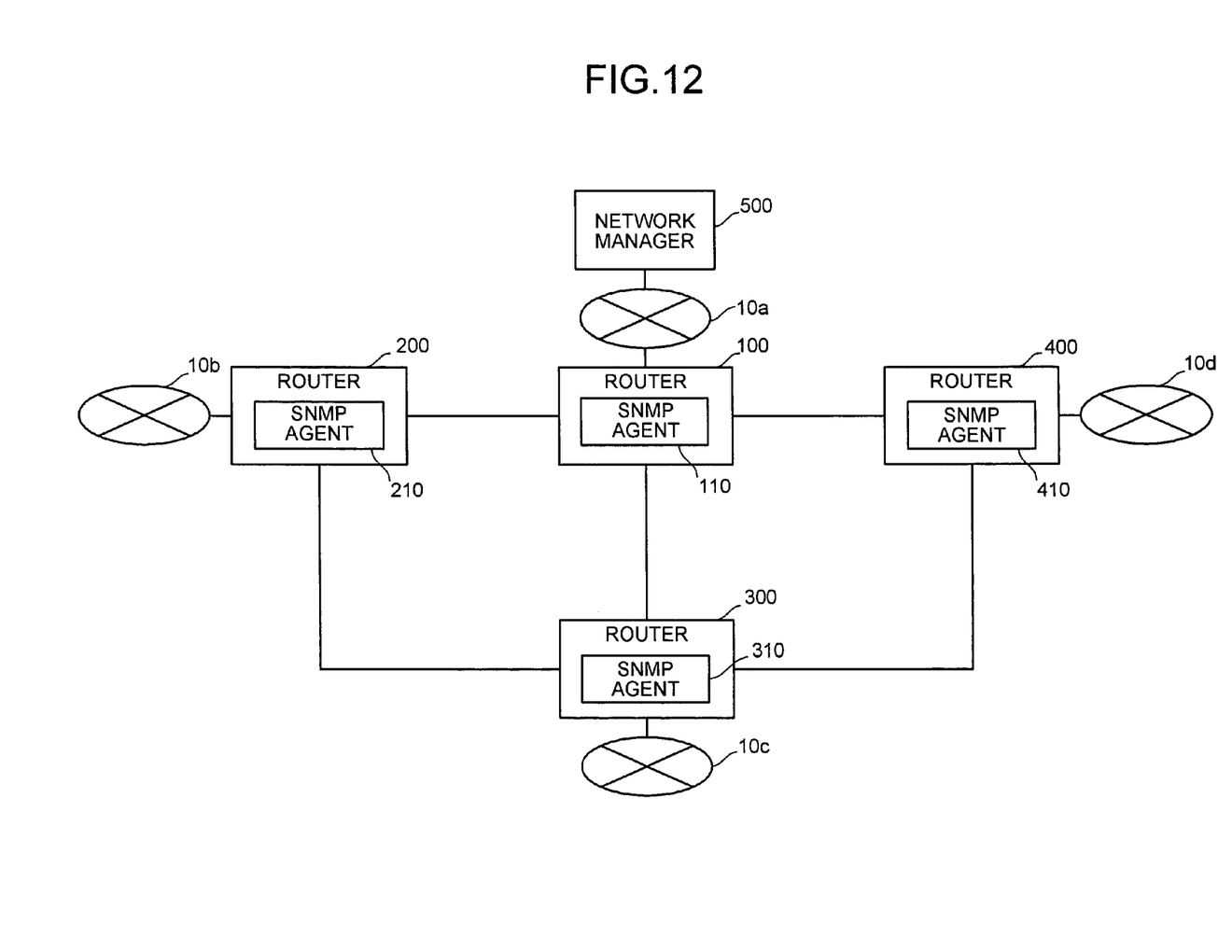
FIG. 12 is a diagram to explain a conventional network monitoring method.

A conventional network monitoring method will be explained first. FIG. 12 is a diagram to explain the conventional network monitoring method. In the network shown in FIG. 12, a router 100 is connected to an Internet protocol (IP) network 10a, a router 200 is connected to an IP network 10b, a router 300 is connected to an IP network 10c, a router 400 is connected to an IP network 10d, and the routers 100 to 400 are mesh-connected.

To monitor the network, the routers 100 to 400 respectively include SNMP agents 110 to 410, and a network manager 500 is connected to the IP network 10a, to integrally manage the SNMP agents 110 to 410. The SNMP agents 110 to 410 obtain the state of the owner apparatus and store the state in an MIB. When the obtained information satisfies a predetermined condition, the SNMP agent notifies this matter to the network manager 500.

The network manager 500 stores information obtained by regularly making an inquiry to the SNMP agents 110 to 410 and information notified by the SNMP agents 110 to 410 in the owner MIB. Upon detecting a failure, the network manager 500 notifies a network administrator of the occurrence of the failure by displaying a message on a monitor or the like. On receiving the notification of failure, the network administrator operates the network manager 500 to make an inquiry about the details of the failure to the SNMP agent of the communication device with the failure, and handles the failure based on the result of inquiry.

If vendors of the routers 100 to 400 are different, the MIB stored in the SNMP agents 110 to 410 are different except for the basic part. Therefore, when the network administrator makes an inquiry about the details of the failure to the SNMP agents 110 to 410, the network administrator must know the specifications of the respective MIBs in detail. This imposes a huge burden on the network administrator, and may cause a delay in handling the failure, and increase the damage.

Figure 1:
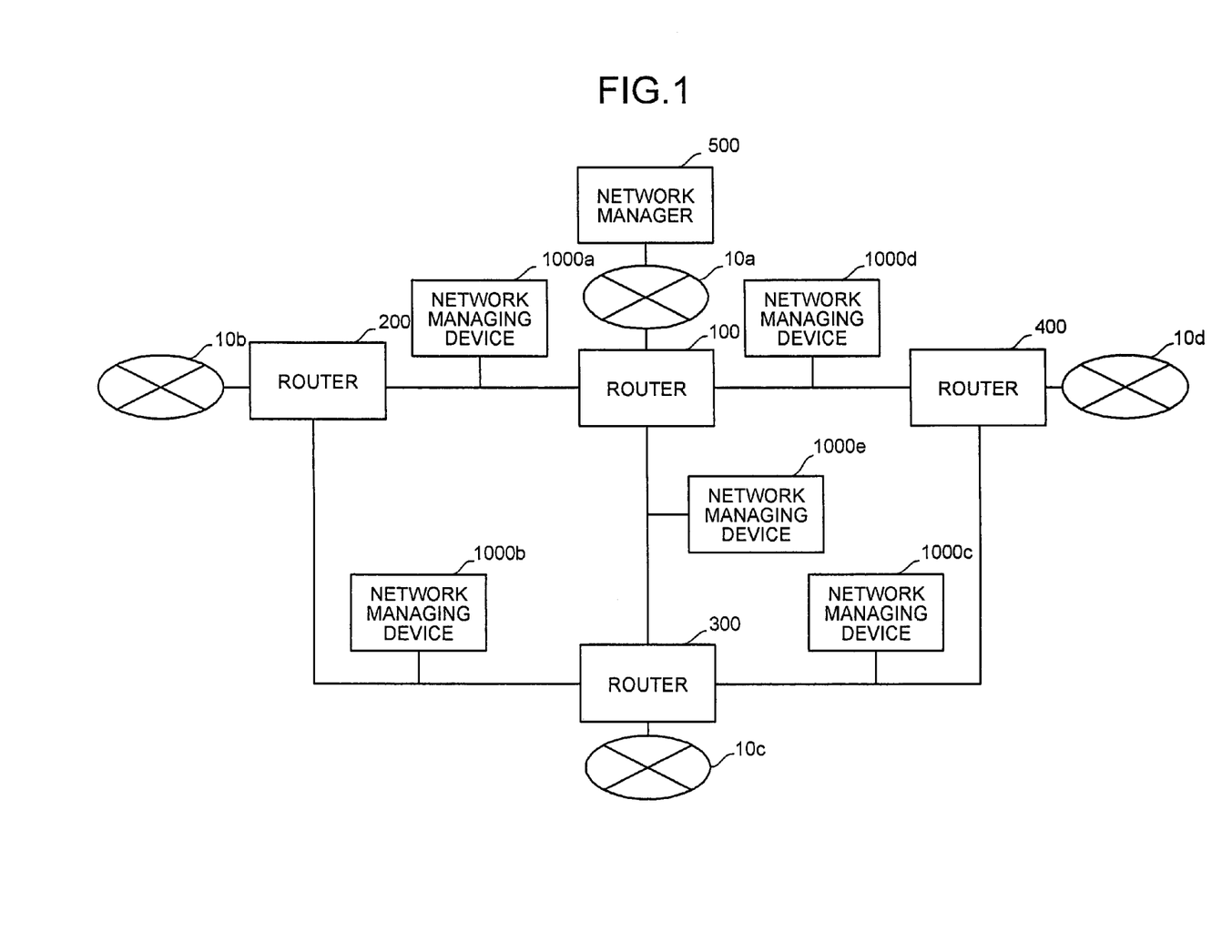
FIG. 1 is a diagram to explain a network monitoring method according to an embodiment.

A network monitoring method according to an embodiment will be explained next. FIG. 1 is diagram to explain the network monitoring method according to the embodiment. According to the network monitoring method of the embodiment, a network device is provided between routers as shown in FIG. 1. The network shown in FIG. 1 includes a network monitoring device 1000*a* between routers 100 and 200, a network monitoring device 1000*b* between routers 200 and 300, a network monitoring device 1000*c* between routers 300 and 400, a network monitoring device 1000*d* between routers 400 and 100, and a network monitoring device 1000*e* between routers 100 and 300.

The network monitoring devices 1000*a* to 1000*e* are connected to a network line via a tap, to read all packets flowing in the network. A tap is an apparatus that branches a network signal to extract the signal. The network monitoring devices 1000*a* to 1000*e* then analyze the network state based on a predetermined rule, and if the network state satisfies a certain condition, notify the network manager 500 of occurrence of failure.

On receiving the notification of failure, the network administrator makes an inquiry about the details of the failure to the network monitoring device that is connected to the network having the failure, by operating the network manager 500, to handle the failure based on the result of the inquiry. Because the product specification of the network monitoring devices 1000*a* to 1000*e* are the same, the network administrator can easily make an inquiry about the details even if vendors of the routers 100 to 400 are different.

Figure 2:
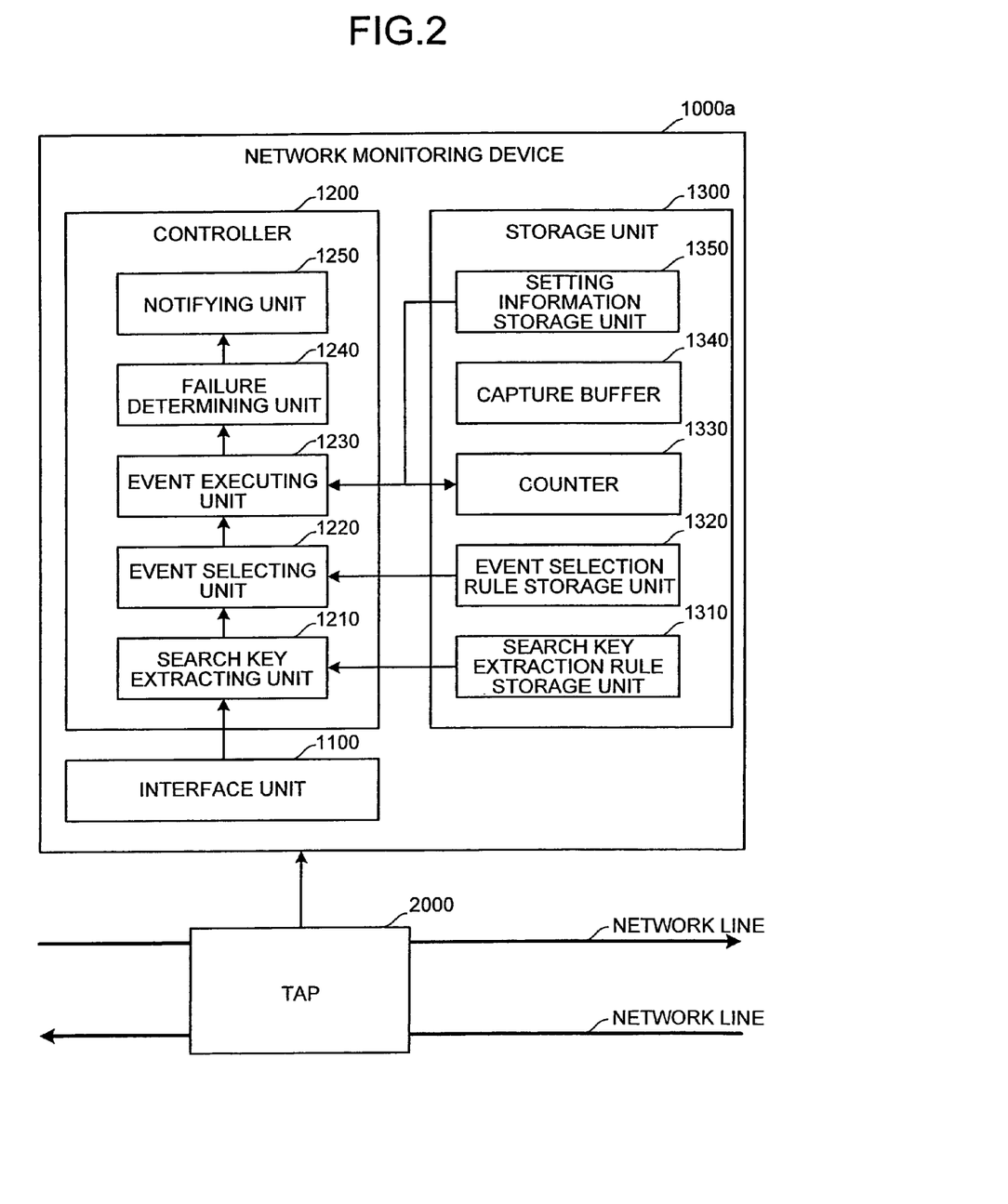
FIG. 2 is a functional block diagram of a configuration of a network monitoring device according to the embodiment.

The configuration of the network monitoring device according to the embodiment will be explained next. FIG. 2 is a functional block diagram of the configuration of the network monitoring device according to the embodiment. Because the network monitoring devices 1000*a* to 1000*e* have the same configuration, the network monitoring device 1000*a* will be explained as an example.

As shown in FIG. 2, the network monitoring device 1000*a* is connected to two-way network lines via a tap 2000. The tap 2000 branches the network line and extracts packets flowing on the network line. In this embodiment, the tap 2000 is independent of the network monitoring device 1000*a*, but the tap 2000 may be in-built in the network monitoring device 1000*a*.

The network monitoring device 1000*a* analyzes the network based on the packet extracted by the tap 2000, and includes an interface unit 1100, a controller 1200, and a storage unit 1300. The interface unit 1100 connects to the line branched by the tap 2000 to read the packet.

The controller 1200 controls the entire network monitoring device 1000*a*, and includes a search key extracting unit 1210, an event selecting unit 1220, an event executing unit 1230, a failure determining unit 1240, and a notifying unit 1250.

The search key extracting unit 1210 extracts a part of the packet read by the interface unit 1100. Extraction is performed based on a search key extraction rule stored in a search key extraction rule storage unit 1310 of the storage unit 1300, and the extracted data is used as a search key for determining how to process the packet.

Figure 3:
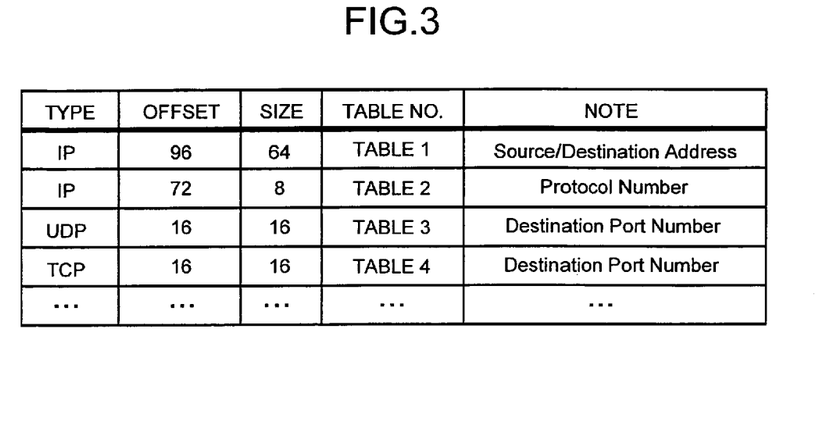
FIG. 3 is a diagram of one example of a search key extraction rule.

The search key extraction rule stored in the search key extraction rule storage unit 1300 will be explained next. FIG. 3 is a diagram of one example of the search key extraction rule. As shown in FIG. 3, the search key extraction rule includes a plurality of entries, and the entries have fields such as type, offset, size, table number, and note. The type indicates the type of packet, which is the subject of the entry, and takes any one value of IP, User Datagram Protocol (UDP), and Transmission Control Protocol (TCP).

The offset column indicates a start position of data to be extracted, and the size column indicates a number of bits of the data to be extracted. The table number column indicates an identification number for identifying the rule for selecting how to process the packet. The rule for selecting how to process the read packet is divided into a plurality of numbers, and is stored in an event selection rule storage unit 1320 of the storage unit 1300; the table number shows which rule is to be used. The note column indicates a comment for the entry. The network administrator can edit the search key extraction rule according to need.

Figure 4:
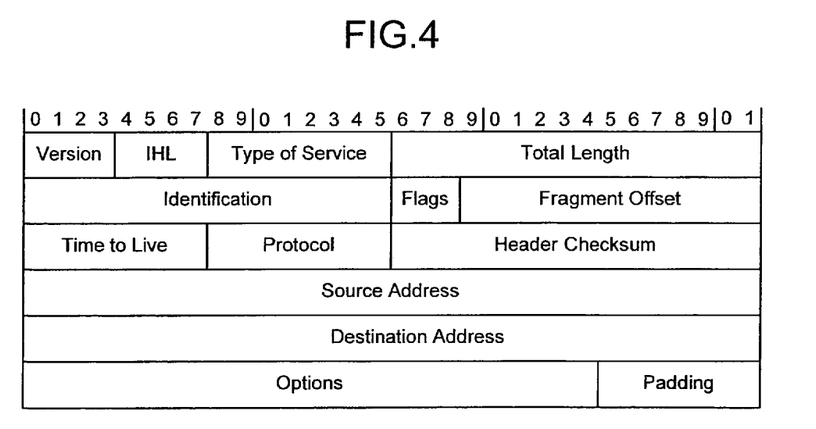
FIG. 4 is a structural drawing of the format of an IP header.

When the type is IP, the entry is for all IP packets, and the offset indicates a position from the top of the IP header. FIG. 4 is a structural drawing of the format of the IP header. For example, when a source IP address (source address) and a destination IP address (destination address) of the IP header are to be extracted, as in the first entry, the offset is set to 96, and the size is set to 64. When the protocol number is to be extracted, as in the second entry, the offset is set to 72, and the size is set to 8.

Figure 5:
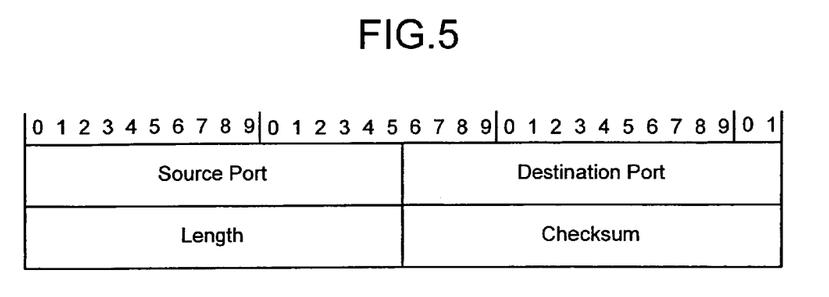
FIG. 5 is a structural drawing of the format of a UDP header.

When the type is UDP, the entry is only for IP packets in the UDP, and the offset indicates a position from the top of the UDP header. FIG. 5 is a structural drawing of the format of the UDP header. For example, when a destination port number (destination port) is to be extracted, as in the third entry, the offset is set to 16, and the size is set to 16.

Figure 6:
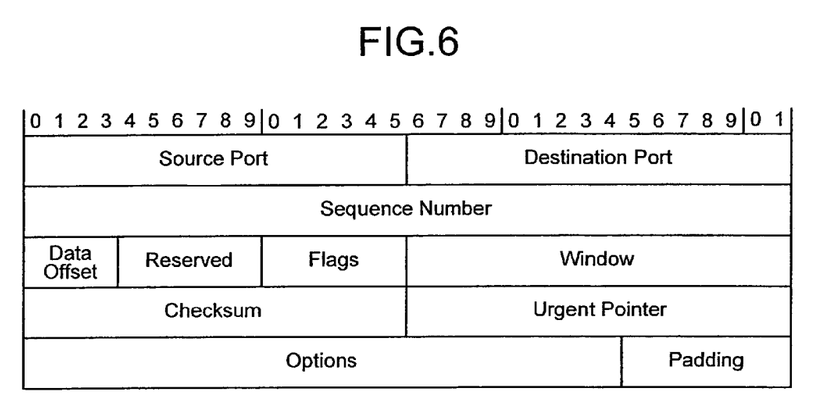
FIG. 6 is a structural drawing of the format of a TCP header.

When the type is TCP, the entry is only for IP packets in the TCP, and the offset indicates a position from the top of the TCP header. FIG. 6 is a structural drawing of the format of the TCP header. For example, when a destination port number (destination port) is to be extracted, as in the fourth entry, the offset is set to 16, and the size is set to 16.

Thus, the network monitoring device 1000*a* according to the embodiment can flexibly set the IP packet to be monitored. For example, when the communication state between particular IP networks is to be monitored, as described above, the type is set to IP, the offset and the size are respectively set to the start portion and the size of the source IP address and the destination IP address. When the state of an IP packet of a particular protocol such as HyperText Transfer Protocol (HTTP) is to be monitored, the type is set to UDP or TCP, as described above, and the offset and the size are respectively set to the start portion and the size of the destination port number.

The event selecting unit 1220 selects an event to be executed with respect to the packet, by using data extracted by the search key extracting unit 1210 as a search key. The event is for a series of steps for processing the packet. Selection of the event is performed based on the event selection rule stored in the event selection rule storage unit 1320 in the storage unit 1300, and the selected event is executed by the event executing unit 1230.

The event selection rule stored in the event selection rule storage unit 1320 will be explained next. There is one event selection rule for each entry in the search key extraction rule. FIGS. 7 to 10 are diagrams of examples of the event selection rule.

Figure 7:
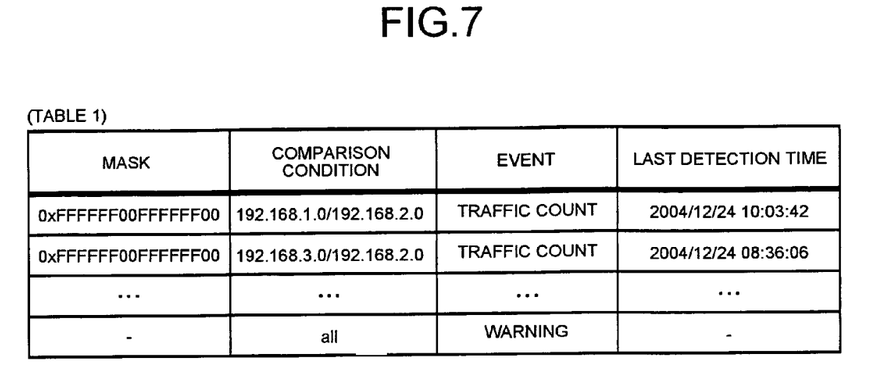
FIG. 7 is a diagram of one example of an event selection rule.

FIG. 7 depicts an event selection rule corresponding to the first entry in the search key extraction rule shown in FIG. 3, which is a rule for selecting an event by the search key used for extracting the source IP address and the destination IP address. As shown in FIG. 7, the event selection rule includes a plurality of entries, and the respective entries have fields such as mask, comparison condition, event name, and last detection time. The network administrator can edit the event selection rule, as required, except the last detection time.

The mask is for setting a mask value for clearing a part of the search keys, and the value set here is used for obtaining a logical product with the search key. This value is set only when it is necessary. In the example shown in FIG. 7, the mask is used for clearing the low order bits of the source IP address and the low order bits of the destination IP address. Thus, by clearing the low order bits of the IP address, a portion common to the IP network at the source and a portion common to the IP network at the destination, of the source IP address and the destination IP address, can be extracted.

The comparison condition is data to be compared with the search key. The event selecting unit 1220 compares the comparison condition with the search key in order from the first entry. If there is an entry, whose comparison condition matches the search key, the event selecting unit 1220 selects the event set in the entry. The event name indicates a name of an event to be executed. The time when the last match of the comparison condition in the entry with the search key is found is stored as the last detection time.

Thus, by storing the last detection time, the time at which the last IP packet to be monitored has passed through the network line in which the network monitoring device 1000*a* is installed can be known, so that the network state can be understood.

For example, when the IP network is mesh-connected as shown in FIG. 1, even if the network manager 500 perceives that all IP networks are operating normally, communication between the IP networks at the terminal may be blocked. In such a case, as in the example shown in FIG. 7, if there is an entry in which the source IP network address and the destination IP address are designated as the comparison condition in the event selection rule, the respective network monitoring devices are compared, so that a section at which the network is shutdown can be known.

When the last detection time is not updated for a predetermined period, the entry may be deleted as being unnecessary. With such a configuration, expansion of the event selection rule can be prevented.

In the first and the second entries in the example shown in FIG. 7, "traffic count" is specified as the event name. This event is for counting the number of IP packets in which the search key agrees with the comparison condition of the entry. This count may be the total number of cases, or the number of cases for each predetermined period.

For example, when the quality of a part of the network degrades and the traffic decreases, if there is an entry in which the source IP network address and the destination IP address are designated as the comparison condition in the event selection rule as shown in FIG. 7, a section at which degradation of the network has occurred can be understood, by comparing the counter values in the respective network monitoring devices.

In the last entry in the example shown in FIG. 7, as the comparison condition is set to "all". This value matches all search keys. Therefore, when the comparison conditions in other entries do not match a search key, the event in this entry is selected at all times. In this entry, an event name is set to "Warning". This event is for notifying the network manager 500 of detection of a packet, which does not match other entries.

Thus, by registering the warning event in the last entry, the network manager 500 is notified when an unexpected IP packet is detected. For example, when a packet from an unexpected IP network is detected, or when a protocol, the use of which is not permitted, is used, this matter can be notified to the network manager 500.

Figure 8:
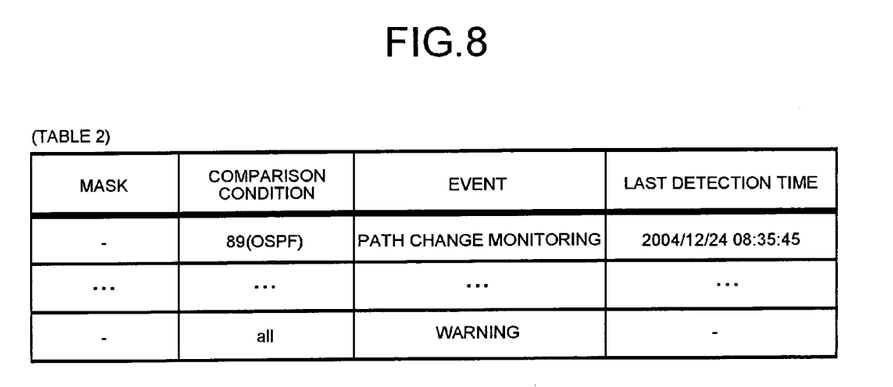
FIG. 8 is a diagram of another example of the event selection rule.

FIG. 8 depicts an event selection rule corresponding to the second entry in the search key extraction rule shown in FIG. 3, which is a rule for selecting an event by the search key used for extracting the protocol number. The first entry in FIG. 8 indicates that when an IP packet in a path control protocol—referred to as Open Shortest Path First (OSPF)—is detected, an event of monitoring a path change is selected. This event is for recording the frequency of the IP packet in the path control protocol and notifying the network manager 500 when the frequency exceeds a predetermined value.

When the network is unstable, though not completely shutdown, a path between routers changes frequently, and the IP packet in the path control protocol is transferred frequently. By detecting this phenomenon, a sign of failure can be found at an early stage.

Figure 9:
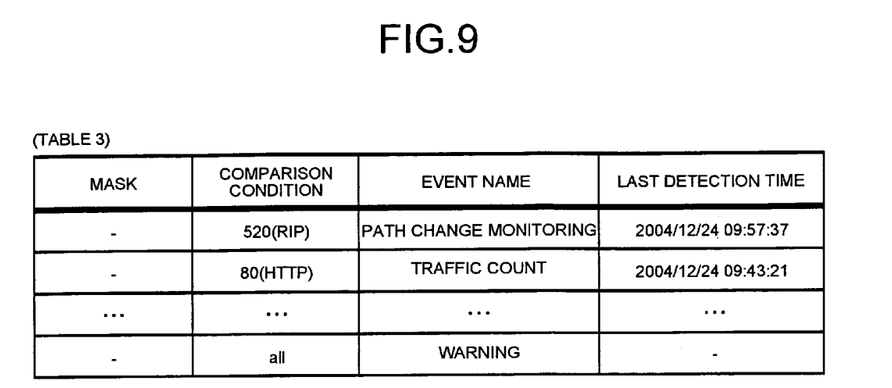
FIG. 9 is a diagram of still another example of the event selection rule.

FIG. 9 depicts an event selection rule corresponding to the third entry in the search key extraction rule shown in FIG. 3, which is a rule for selecting an event by the search key used for extracting the destination port number of the IP packet in the UDP. The first entry in FIG. 9 indicates that when an IP packet in the path control protocol—referred to as Routing Information Protocol (RIP)—is detected, an event of monitoring a path change is selected. The second entry indicates that when an IP packet in the HTTP is detected, an event of traffic count is selected.

Figure 10:
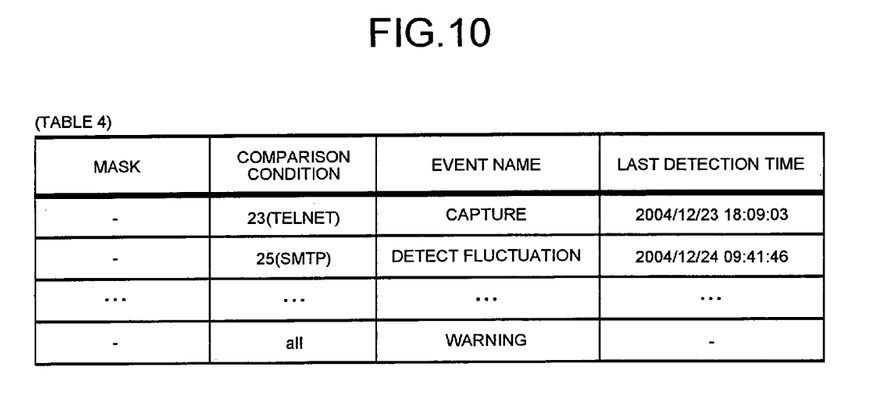
FIG. 10 is a diagram of still another example of the event selection rule.

FIG. 10 depicts an event selection rule corresponding to the fourth entry in the search key extraction rule shown in FIG. 3, which is a rule for selecting an event by the search key used for extracting the destination port number of the IP packet in the TCP. The first entry in FIG. 10 indicates that when an IP packet in a protocol referred to as TELNET is detected, a capture event is selected. This event is for storing the IP packet as it is.

By storing the IP packet as it is, the state at the time of occurrence of a failure can be known in detail, thereby enabling quick understanding of the cause and hence, the failure can be dealt with immediately.

The second entry in FIG. 10 indicates that when an IP packet in a protocol—referred to as Simple Mail Transfer Protocol (SMTP)—is detected, an event of detecting fluctuation is selected. This event is for monitoring fluctuation in the transfer rate of the IP packet, and when the fluctuation exceeds a predetermined value, the fact is notified to the network manager 500. The transfer rate of the IP packet can be obtained by comparing the transmission time recorded in the IP packet and the current time.

When the network quality degrades and makes the network unstable, the transfer rate of the IP packet fluctuates. By detecting this phenomenon, a sign of a failure can be found at an early stage.

Referring back to FIG. 2, the event executing unit 1230 executes the event selected by the event selecting unit 1220. For example, if the event selected by the event selecting unit 1220 is "capture", the event executing unit 1230 stores a packet in a capture buffer 1340 in the storage unit 1300.

The failure determining unit 1240 determines whether there is a failure in the network based on the result of the event executed by the event executing unit 1230. For example, when the event executed by the event executing unit 1230 is to record the frequency of a packet in the path control protocol, the failure determining unit 1240 checks if the recorded frequency exceeds a predetermined value, and if the recorded frequency exceeds the predetermined value, the failure determining unit 1240 determines that there is a failure. When the failure determining unit 1240 determines that there is a failure, the notifying unit 1250 notifies the network manager 500 of the occurrence of the failure.

In FIG. 2, a unit with which the network monitoring device 1000a and the network manager 500 exchange information is not shown, but this unit can be realized by any method. For example, communication may be performed through a network line to be monitored, or may be performed through another wired or wireless line. When another line is used, communication is possible even when a failure occurs in the network to be monitored. Therefore, it is more preferable to use another line than using the network line to be monitored.

The storage unit 1300 is a memory, for example, and includes the search key extraction rule storage unit 1310, the event selection rule storage unit 1320, a counter 1330, the capture buffer 1340, and a setting information storage unit 1350. The search key extraction rule storage unit 1310 stores the search key extraction rule, and the event selection rule storage unit 1320 stores the event selection rule.

The counter 1330 records the number of IP packets, when the event "traffic count" is executed. The capture buffer 1340 stores the IP packet when executing the capture event. The setting information storage unit 1350 stores setting information such as a threshold for determining whether the frequency of the IP packet in the path control protocol is abnormal.

Figure 11:
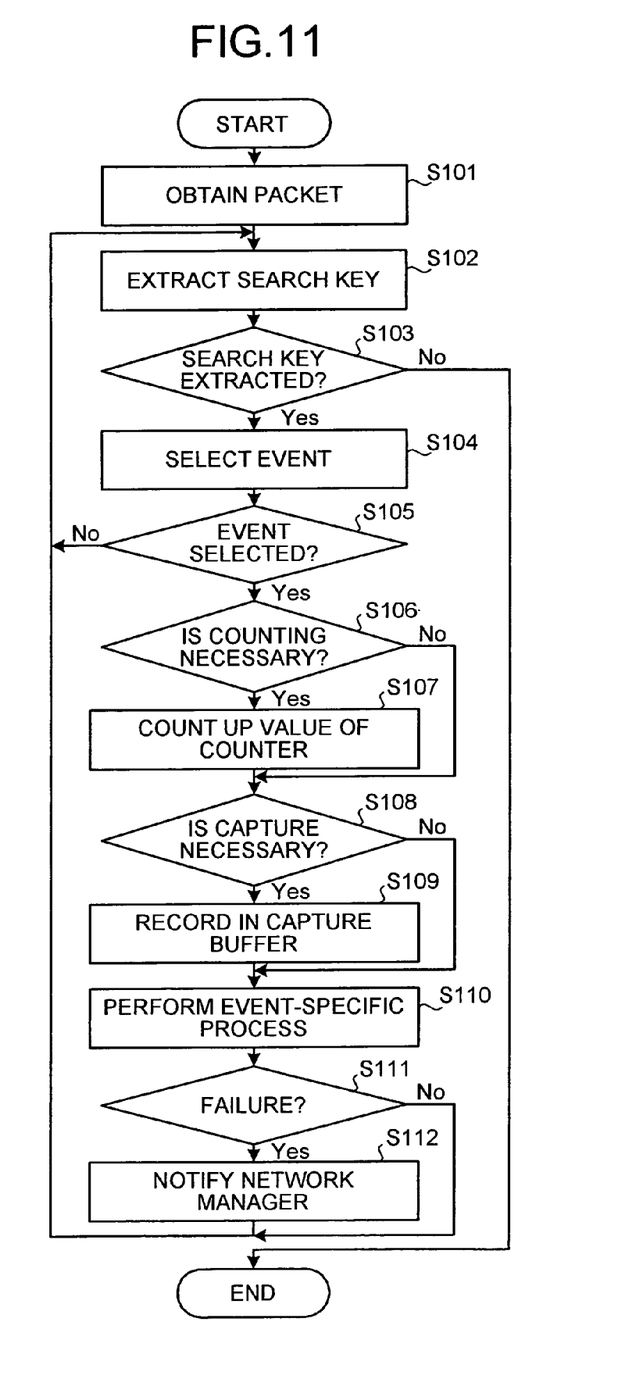
FIG. 11 is a flowchart of a process procedure executed by the network monitoring device shown in FIG. 2.

The process procedure of the network monitoring device 1000a shown in FIG. 2 will be explained below. FIG. 11 is a flowchart of the process procedure of the network monitoring device 1000a shown in FIG. 2. As shown in FIG. 2, in the network monitoring device 1000a, the interface unit 1100 obtains a packet (step S101), and the search key extracting unit 1210 extracts a search key (step S102).

If there no search key is extracted (No at step S103), the process ends. If a search key is extracted (Yes at step S103), the event selecting unit 1220 selects an event corresponding to the search key (step S104). If there is no event corresponding to the search key (No at step S105), the process returns to step S102, to extract another search key from the packet.

If there is an event corresponding to the search key (Yes at step S105), the event executing unit 1230 executes the event. If update of the counter is necessary (Yes at step S106), the counter 1330 is updated (step S107). If capture is necessary (Yes at step S108), the IP packet is stored in the capture buffer 1340 (step S109).

The network monitoring device 1000a then executes other types of event-specific processes (step S110). If the failure determining unit 1240 determines that a failure has occurred in the network (Yes at step S111), the notifying unit 1250 notifies the network manager 500 of the occurrence of the failure (step S112). The process returns to step S102, to extract another search key in the packet.

In the embodiment, because the network monitoring devices 1000a to 1000e monitor the network autonomously, monitoring of the network can be performed even in a network including communication devices having different specifications, without being affected by the difference in the specifications. When the network monitoring devices 1000a to 1000e detect a failure in the network, it is notified to the network manager 500. Therefore, the failure can be handled at an early stage.

According to the present invention, even in a network including communication devices having different specifications, the network monitoring device can monitor the network without being affected by a difference in specifications.

Moreover, the failure can be handled at an early stage.

Furthermore, the network analysis can be flexibly changed only by changing the rules.

Moreover, even when the router or the like seems to be operating normally, a failure can be found at an early stage based on the reception frequency.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network monitoring device that monitors a network state, comprising:
   a receiving unit that receives a packet passing through the network;
   an extracting unit that extracts a search key data from the packet, based on a first rule stored in advance in a storage unit;
   a searching/selecting unit that searches a second rule stored in advance in the storage unit, using the search key extracted, and selects an analyzing process for the network state, based on a result of the search;
   a processing unit that performs the analyzing process with respect to the packet received;
   a determining unit that determines whether a failure has occurred in the network, based on a result obtained by the processing unit; and
   a notifying unit that notifies an integrated management device of failure, when the determining unit determines that a failure has occurred in the network.

2. The network monitoring device according to claim 1, wherein
   when the second rule includes an entry corresponding to the search key, the searching/selecting unit records the current time in the entry.

3. The network monitoring device according to claim 1, wherein
   the processing unit stores, in the storage unit, a number of packets of the same type as the packet received.

4. The network monitoring device according to claim 1, wherein
   the processing unit records a reception frequency of a packet related to path control, and
   the determining unit determines whether a failure has occurred in the network, based on the reception frequency.

5. The network monitoring device according to claim 1, wherein
   the processing unit stores the packet received, in a storage unit.

6. The network monitoring device according to claim 1, wherein
   the processing unit records a transmission rate of the packet, and
   the determining unit determines whether a failure has occurred in the network, based on fluctuations in the transmission rate.

7. The network monitoring device according to claim 1, wherein
   when the searching/selecting unit cannot search an entry corresponding to the search key from the second rule, the notifying unit notifies the integrated management device that no entry is found.

8. A network monitoring method that monitors a network state, comprising:
   receiving a packet passing through the network;

extracting a search key data from the packet, based on a first rule stored in advance in a storage unit;

selecting a second rule stored in advance in the storage unit, using the search key extracted;

selecting an analyzing process for the network state, based on a result obtained at the searching;

performing the analyzing process with respect to the packet received;

determining whether a failure has occurred in the network, based on a result obtained at the analyzing; and notifying an integrated management device of failure, when it is determined at the determining that a failure has occurred in the network.

* * * * *